United States Patent
Ogawa

(10) Patent No.: US 11,597,373 B2
(45) Date of Patent: Mar. 7, 2023

(54) HYBRID VEHICLE DRIVE SUPPORT PLAN ACCORDING TO ROUTE AND AIR CONDITIONING POWER CONSUMPTION

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 258 days.

(21) Appl. No.: 17/007,137

(22) Filed: Aug. 31, 2020

(65) Prior Publication Data

US 2021/0078567 A1 Mar. 18, 2021

(30) Foreign Application Priority Data

Sep. 18, 2019 (JP) .............................. JP2019-169487

(51) Int. Cl.
*B60W 20/13* (2016.01)
*B60K 6/20* (2007.10)

(52) U.S. Cl.
CPC ............. *B60W 20/13* (2016.01); *B60K 6/20* (2013.01); *B60Y 2200/92* (2013.01); *B60Y 2300/182* (2013.01)

(58) Field of Classification Search
CPC ............. B60W 20/13; B60W 50/0097; B60W 2510/244; B60W 2510/305; B60W 2554/406; B60W 2555/20; B60W 2556/50; B60W 10/06; B60W 10/08; B60W 10/30; B60W 20/12; B60W 10/26; B60W 30/182; B60K 6/20; B60Y 2200/92; B60Y 2300/182; Y02T 10/62; Y02T 10/70; Y02T 10/72
See application file for complete search history.

(56) References Cited

U.S. PATENT DOCUMENTS

2012/0290161 A1* 11/2012 Takeda .................... B60L 1/00
                                                903/930
2016/0221567 A1   8/2016 Ogawa

FOREIGN PATENT DOCUMENTS

| JP | 2011-255686 A | 12/2011 |
| JP | 2013-075615 A | 4/2013 |
| JP | 2014-135822 A | 7/2014 |
| JP | 2014-151760 A | 8/2014 |
| JP | 2015-80962 A | 4/2015 |

(Continued)

*Primary Examiner* — Brian P Sweeney
(74) *Attorney, Agent, or Firm* — Sughrue Mion, PLLC

(57) ABSTRACT

There is provided a hybrid vehicle to suppress hunting (inversion) of a drive mode in a short time. The hybrid vehicle has an engine, a motor, a battery, an air conditioning system configured to condition air in a passenger compartment, and map information, and sets a drive route from the present location to the destination, and creates a drive support plan in which one of the drive modes including CD mode and CS mode is assigned to each drive section of the drive route to perform the drive support control. The drive support plan is created based on the battery remaining capacity taking into account the power consumption of the air conditioning system. When the predetermined condition that is based on the battery remaining capacity without taking into account the power consumption of the air conditioning system is satisfied while performing the drive support control, the driving state is continued.

4 Claims, 3 Drawing Sheets

(56) References Cited

FOREIGN PATENT DOCUMENTS

JP         2018-114815 A     7/2018
WO    WO 2014109325 A1 *  7/2014  ............. B60L 1/003

* cited by examiner

HYBRID VEHICLE DRIVE SUPPORT PLAN ACCORDING TO ROUTE AND AIR CONDITIONING POWER CONSUMPTION

CROSS-REFERENCE TO RELATED APPLICATIONS

The present disclosure claims priority to Japanese Patent Application No. 2019-169487 filed Sep. 18, 2019, which is incorporated herein by reference in its entirety including specification, drawings and claims.

TECHNICAL FIELD

The present disclosure relates to a hybrid vehicle for managing an application of a plurality of drive modes.

BACKGROUND

A conventionally known hybrid vehicle of this type performs a drive support control for driving the hybrid vehicle along with a drive support plan in each of drive sections of a drive route from a current location to a destination (as described in, for example, JP2014-151760A). The drive support plan is created by assigning one of a motor drive (EV drive) mode in which an engine is stopped and the hybrid vehicle is driven with a power from a motor, and a hybrid drive (HV drive) mode in which the hybrid vehicle is driven with a power from an engine and a power from a motor during operation of the engine. The drive support plan is created to assign the motor drive mode and the hybrid drive mode such that a state of charge SOC (SOC: State of Charge) that is a ratio of remaining capacity of a battery becomes equal to a value 0 when the hybrid vehicle reaches the destination.

SUMMARY

Preferably, a drive support plan is created by calculating energy consumption of each of drive sections of a drive route based on road traffic information. The road traffic information includes, for example, information on current and future traffic congestion, information on predicted values of current average vehicle speed and future average vehicle speed in each of drive sections of the drive route, information on traffic regulation, information on weather conditions, information on road conditions, and map information. The road traffic information can be obtained by communicating with an external traffic information management center or the like. Generally, vehicles are often provided with an air conditioning system to condition air in a passenger compartment. Since power consumption of the battery depends on the degree of operation of the air conditioning system, it is necessary to create the drive support plan taking into account the operating state of the air conditioning system. On the other hand, when taking into account the power consumption by the air conditioning system, a driving state such as a motor drive and a hybrid drive may invert in a short time.

A hybrid vehicle of the present disclosure mainly aims to suppress hunting (inversion) of the driving state in a short time.

In order to achieve the above primary object, the hybrid vehicle of the present disclosure employs the following configuration.

The present disclosure is directed to a hybrid vehicle. The hybrid vehicle includes an engine, a motor, a battery, an air conditioning system configured to condition air in a passenger compartment, map information, and a control device programmed to set a drive route from a current location to a destination, to create a drive support plan that assigns one of drive modes including a CD mode and a CS mode to each of drive sections of the drive route, and to perform drive support control that causes the hybrid vehicle to be driven along the drive support plan. The control device includes a device configured to create the drive support plan based on battery remaining capacity taking into account a power consumption of the air conditioning system, and to continue a driving state when a predetermined condition that is based on the battery remaining capacity without taking into account the power consumption of the air conditioning system is satisfied during the drive support control.

The hybrid vehicle of the present disclosure sets the drive route from the current location to the destination and creates the drive support plan that assigns one of drive modes including the CD mode and the CS mode to each of drive sections of the drive route. The hybrid vehicle of the present disclosure performs the drive support control for driving the hybrid vehicle along the drive support plan. The CD mode (Charge Depleting mode) gives a priority to a motor drive (EV drive) to reduce a state of charge SOC of the battery. The CS mode (Charge Sustaining mode) uses the motor drive and a hybrid drive (HV drive) in combination to maintain the state of charge SOC of the battery. In the motor drive, the hybrid vehicle is driven only by the power from the motor while the engine is stopped. In the hybrid drive, the hybrid vehicle is driven by the power from the engine and the motor during operation of the engine. The control device creates the drive support plan based on the battery remaining capacity taking into account the power consumption of the air conditioning system. Thus, it is possible to create a more appropriate drive support plan. Further, the control device continues the driving state when the predetermined condition that is based on the battery remaining capacity without taking into account the power consumption of the air conditioning system is satisfied while performing the drive support control. The driving state includes a state of a motor drive and a state of a hybrid drive. This suppresses inversion of the driving state in a short time compared to when the control device changes the driving state based on the battery remaining capacity taking into account the power consumption of the air conditioning system upon satisfaction of the predetermined condition that is based on the battery remaining capacity without taking into account the power consumption of the air conditioning system.

DESCRIPTION OF EMBODIMENTS

Figure 1:
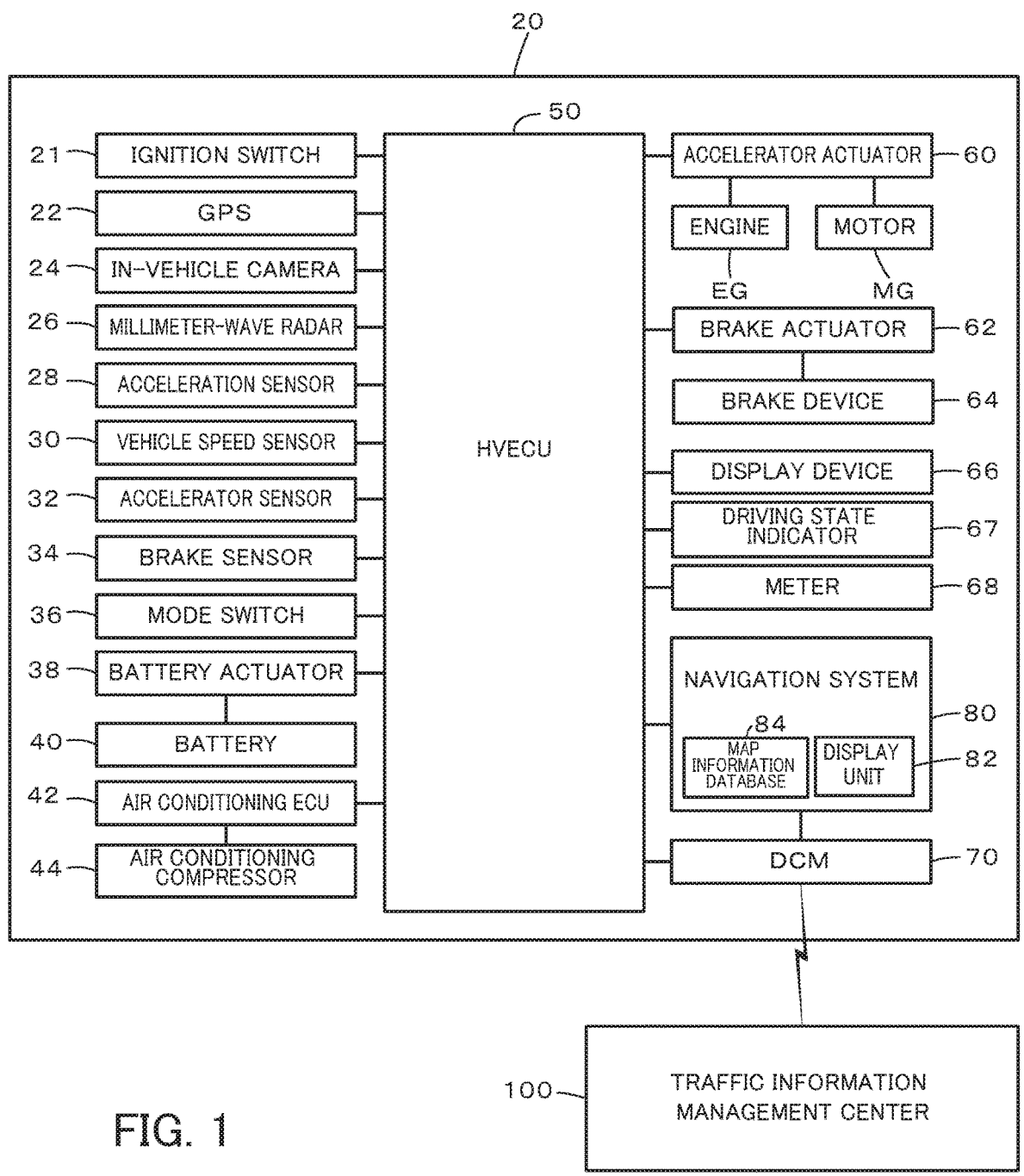
FIG. 1 is a block diagram illustrating an example of a configuration of a hybrid vehicle focusing on a hybrid electronic control unit according to an embodiment of the present disclosure.

The following describes some aspects of the disclosure with reference to embodiments. FIG. 1 is a block diagram illustrating an example of a configuration of a hybrid vehicle 20 focusing on a hybrid electronic control unit (hereinafter referred as "HVECU") 50 according to an embodiment of the present disclosure. The hybrid vehicle 20 of the embodiment includes an engine EG and a motor MG as a power source. The hybrid vehicle 20 of the embodiment is driven by switching between a CD mode (Charge Depleting mode) and a CS mode (Charge Sustaining mode). In the CD mode, the motor drive is prioritized to reduce the state of charge SOC of a battery 40. In the CS mode, the motor drive and the hybrid drive are combined to maintain the state of charge SOC of the battery 40 at a target ratio. In the motor drive, the hybrid vehicle 20 is driven only by the power from the motor MG while the engine EG is stopped. In the hybrid drive, the hybrid vehicle 20 is driven by the power from the engine EG and the motor MG during operation of the engine 20.

The hybrid vehicle 20 of the embodiment includes an ignition switch 21, a GPS (Global Positioning System, Global Positioning Satellite) 22, an in-vehicle camera 24, a millimeter-wave radar 26, an acceleration sensor 28, a vehicle speed sensor 30, an accelerator sensor 32, a brake sensor 34, a mode switch 36, a battery actuator 38, the battery 40, an air conditioning electronic control unit (hereinafter referred to as an air conditioning ECU) 42, an air conditioning compressor 44, the HVECU 50, an accelerator actuator 60, a brake actuator 62, a brake device 64, a display device 66, a driving state indicator 67, a meter 68, a DCM (Data Communication Module) 70, and a navigation system 80 in addition to the power source.

The GPS 22 is a device for detecting a position of a vehicle based on signals transmitted from a plurality of GPS satellites. The in-vehicle camera 24 is a camera that captures an image of the surroundings of the vehicle, and corresponds to, for example, a front camera that captures an image of the front of the vehicle, a rear camera that captures an image of the rear of the vehicle. The millimeter-wave radar 26 detects a distance and a relative speed between the own vehicle and a vehicle ahead. The millimeter-wave radar 26 also detects a distance and a relative speed between the own vehicle and a vehicle behind.

The acceleration sensor 28 is, for example, a sensor for detecting acceleration in the longitudinal direction of the vehicle and detecting acceleration in the lateral direction of the vehicle. The vehicle speed sensor 30 detects vehicle speed based on wheel speed or the like. The accelerator sensor 32 detects accelerator position or the like according to a depression amount of an accelerator pedal by the driver. The brake sensor 34 detects a brake position or the like as a depression amount of a brake pedal by the driver. The mode switch 36 switches between the CD mode and the CS mode, and is arranged in the vicinity of a steering wheel of the driver's seat.

The battery actuator 38 detects various states of the battery 40, for example, a voltage between terminals, a charge/discharge current, and a battery temperature. The battery actuator 38 is configured to control the battery 40 based on the detected values. The battery actuator 38 calculates the state of charge SOC as a ratio of the remaining capacity of electric power dischargeable from the battery to the overall capacity of the battery based on the charge/discharge current. The battery actuator 38 also calculates an allowable maximum output power (output limit Wout) as to be output from the battery 40 and an allowable maximum input power (input limit Win) as to be input into the battery 40 based on the calculated state of charge SOC, the battery temperature, and the like. The battery 40 is configured as a chargeable and dischargeable secondary battery, and for example, a lithium ion battery, a nickel metal hydride battery, or a lead storage battery may be used.

The air conditioning ECU 42 is configured as a CPU-based microcomputer (CPU: not shown). The air conditioning ECU 42 also includes, for example, a ROM, a RAM, a flash memory, input/output ports, and a communication port. The air conditioning ECU 42 is incorporated in an air conditioning system configured to condition air in the passenger compartment. The air conditioning ECU 42 drives and controls the air conditioning compressor 44 in the air conditioning system such that the temperature of the passenger compartment becomes the set temperature.

The engine EG is configured, for example, as an internal combustion engine. The motor MG is configured, for example, as an electric motor that also functions as a generator such as a synchronous motor. The motor MG is connected to the battery 40 via an inverter (not shown), and outputs driving force by using electric power supplied from the battery 40 or charges the battery 40 with the generated electric power.

The HVECU 50 is configured as a CPU-based microcomputer (CPU: not shown). The HVECU 50 also includes, for example, a ROM, a RAM, a flash memory, input/output ports, and a communication port. The HVECU 50 sets a drive mode. The HVECU 50 also sets a target drive point (target rotation speed or target torque) of the engine EG and a torque command of the motor MG based on the set drive mode, the accelerator position from the accelerator sensor 32, the brake position from the brake sensor 34, and the input/output limit from the battery actuator 38.

The HVECU 50 performs the following processing when the hybrid vehicle is driven in the motor drive. The HVECU 50 sets a required driving force and a required power based on the accelerator position from the accelerator sensor 32 and the vehicle speed from the vehicle speed sensor 30. The HVECU 50 sets the torque command of the motor MG to output the required driving force and the required power to the vehicle. The HVECU 50 transmits the set torque command to the accelerator actuator 60. The HVECU 50 performs the following processing when the hybrid vehicle is driven in a hybrid drive (HV drive). The HVECU 50 sets the target drive point of the engine EG and the torque command of the motor MG to output the required driving force and the required power to the vehicle. The HVECU 50 transmits the target drive point and the torque command to the accelerator actuator 60. The HVECU 50 performs the following processing in response to a depression of the brake pedal by the driver. The HVECU 50 sets the required braking force based on the brake position from the brake sensor 34 and the vehicle speed from the vehicle speed sensor 30. The HVECU 50 sets a regenerative torque command for regenerative control of the motor MG and a target braking force by the brake device based on the required braking force and the vehicle speed. The HVECU 50 transmits the torque command to the accelerator actuator 60 and transmits the target braking force to the brake actuator 62.

The accelerator actuator 60 drives and controls the engine EG and the motor MG in accordance with the target drive point and the torque command set by the HVECU 50. The accelerator actuator 60 performs intake air flow control, fuel injection control, ignition control, intake valve opening/closing timing control and the like to operate the engine EG at the target operation point (target rotation speed or target torque). Further, the accelerator actuator 60 performs switching control of the switching element of the inverter for driving the motor MG such that a torque corresponding to the torque command is output from the motor MG.

The brake actuator 62 controls the brake device 64 such that the target braking force set by the HVECU 50 is applied to the vehicle by the brake device 64. The brake control device 64 is configured, for example, as a hydraulically driven friction brake.

The display device 66 is incorporated in, for example, an installation panel in front of the driver's seat. The display device 66 displays various information. The driving state indicator 67 includes an EV indicator (not shown) and an HV indicator (not shown). The driving state indicator 67 turns on the EV indicator and turns off the HV indicator during a motor drive. The driving state indicator 67 turns off the EV indicator and turns on the HV indicator during a hybrid drive. The meter 68 is incorporated in, for example, the installation panel in front of the driver's seat.

The DCM (Data Communication Module) 70 transmits information on the own vehicle to a traffic information management center 100 and receives road traffic information from the traffic information management center 100. The information on the own vehicle includes, for example, a position, a vehicle speed, a driving power and a drive mode of the own vehicle. The road traffic information includes, for example, information on current and future traffic congestion, information on current average vehicle speed and predicted value of future average vehicle speed in each of drive sections of the drive route, information on traffic regulation, information on weather conditions, information on road conditions, and map information. The DCM 70 communicates with the traffic information management center 100 at every predetermined time interval (for example, every 30 seconds, every minute, every two minutes).

The navigation system 80 is configured to guide the own vehicle to a set destination. The navigation system 80 includes a display unit 82 and a map information database 84. The navigational system 80 communicates with the traffic information management center 100 via the DCM 70. When the destination is set, the navigation system 80 sets the route based on information on the destination, information on the current location (current location of the own vehicle) received from the GPS 22, and information stored in the map information data base 84. The navigation system 80 communicates with the traffic information management center 100 at every predetermined time interval (for example, every 3 minutes or every 5 minutes) to obtain road traffic information and performs route guidance based on the road traffic information.

When the route guidance is performed, the navigation system 80 generates a read-ahead information, such as a load information necessary for driving of each drive section, and transmits the read-ahead information to the HVECU 50 every time (or at every predetermined time interval) the road traffic information is obtained from the traffic information management center 100. The read-ahead information is generated based on, for example, information on each of drive sections of the drive route in the road traffic information obtained from the traffic information management center 100, information on driving load, the vehicle speed of the own vehicle, the driving power of the own vehicle, and the drive mode of the own vehicle. The HVECU 50 creates a drive support plan that assigns one of drive modes including the CD mode and the CS mode to each of drive sections of the drive route using the read-ahead information received from the navigation system 80 when the drive support control can be performed, and performs the drive support plan.

When update information included in the map information is obtained from the traffic information management center 100, the navigation system 80 displays the item "map update" on the display unit 82 and announces "Map information is ready to be updated. Please press the map update button." or the like. When the item "map update" is operated in response to the notification of the map update, the navigation system 80 communicates with the traffic information management center 100 via the DCM 70, obtains the map information related to the map update, and stores the map information in the map information database 84. When the map information is updated, the navigation system 80 announces "Some functions are stopped during update of map information." or the like.

The navigational system 80 counts an alive counter Cnb that increments by a value 1 at every predetermined time interval to inform the HVECU 50 or the like that the navigation system 80 is normally activated. The HVECU 50 obtains the alive counter Cnb from the navigation system 80 at every predetermined time interval and confirms that the navigation system 80 is normally activated. According to the embodiment, the navigation system 80 does not count the alive counter Cnb as a stop function during the update of the map information. The HVECU 50 counts an alive counter Chv that increments by a value 1 at every predetermined time interval to inform the navigation system 80 or the like that the navigation system is normally activated. The navigation system 80 obtains the alive counter Chv from the HVECU 50 at every predetermined time interval and confirms that the HVECU 50 is normally activated.

Figure 2:
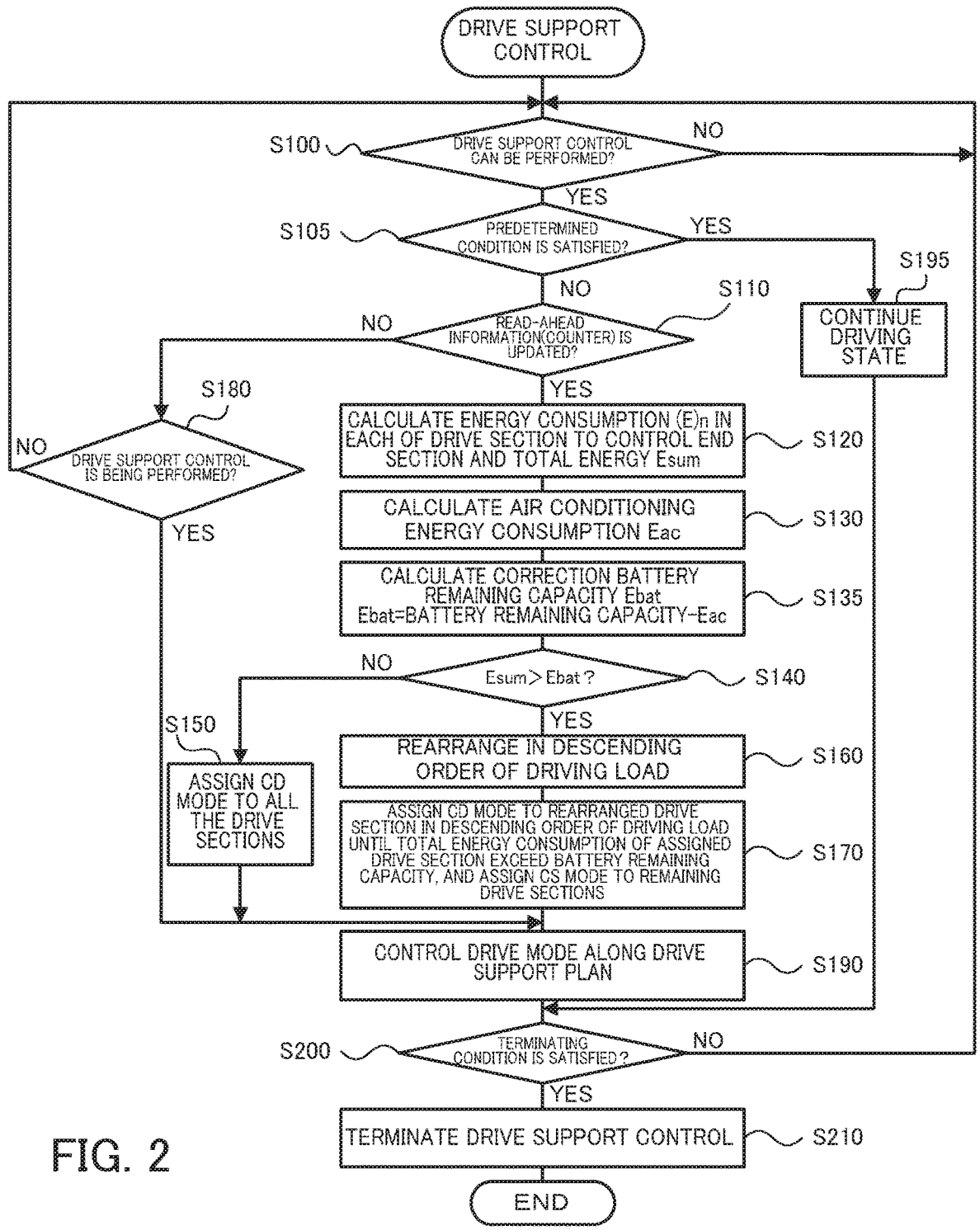
FIG. 2 is a flow chart showing one example of a drive support control performed by the hybrid electronic control unit.
Figure 3:
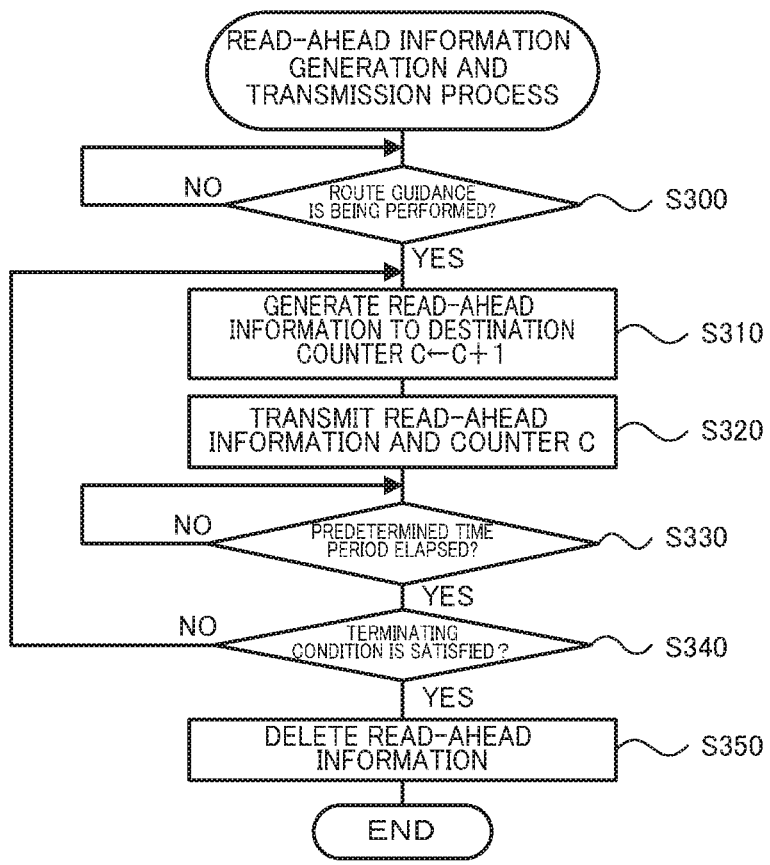
FIG. 3 is a flowchart showing one example of a read-ahead information generation and transmission process performed by a navigation system.

The following describes operations of the hybrid vehicle 20 of the embodiment, particularly, the operation when the map information is updated during the drive support control. FIG. 2 is a flow chart showing one example of a drive support control performed by the HVECU 50. This routine is performed when a destination is set, for example. FIG. 3 is a flowchart showing one example of a read-ahead information generation and transmission process performed by the navigation system 80. This routine is performed when a destination is set, for example. The following sequentially describes the drive support control, and the read-ahead information generation and transmission process.

The drive support control is described first. The HVECU 50 first determines whether the drive support control can be performed (step S100). The drive support control assigns one of drive modes including the CD mode and the CS mode to each of drive sections of the drive route and the hybrid vehicle is driven when the route from the current location to the destination is set by the navigation system 80. The HVECU 50 does not perform the drive support control when the destination is not set. The HVECU 50 does not perform the drive support control when the route guidance cannot be satisfactorily performed, for example, when there is any abnormality in the navigation system 80 or the GPS 22. Further, the HVECU 50 does not perform the drive support control when the output limit Wout that is a maximum allowable output power output from the battery 40 is small due to the low temperature of the battery 40. In this state, the engine EG may be frequently started even when the vehicle drives in the CD mode, and the vehicle cannot be driven properly in the CD mode. The HVECU 50 determines whether the drive support control can be performed at step S100 due to the circumstance described above. When it is determined at step S100 that the drive support control cannot be performed, the hybrid ECU 50 waits until the drive support control can be performed.

When it is determined at step S100 that the drive support control can be performed, the HVECU 50 determines whether a predetermined condition is satisfied (step S105).

The predetermined condition will be described later. When it is determined at step S105 that the predetermined condition is not satisfied, the HVECU 50 determines whether the read-ahead information transmitted and received from the navigation system 80 is updated (step S110). When it is determined at step S110 that the read-ahead information is updated, the HVECU 50 calculates an energy consumption E (n) in each of drive sections of the drive route from the current location to the control end section (destination), and a total energy Esum as the sum of the each energy consumption E(n) (step S120). The energy consumption E(n) in each of drive sections can be determined based on criteria such as whether the drive section is an urban area, a suburban area, or a mountainous area.

The HVECU 50 subsequently calculates an air conditioning energy consumption Eac (step S130). The air conditioning energy consumption Eac is set to a value 0 when the air conditioning system is off and is set to the calculated value when the air conditioning system is on. The air conditioning energy consumption Eac is an amount of electric power that is obtained, for example, by multiplying a predetermined power set as relatively small power as a power consumption of the air conditioning system by a time required to drive a predetermined distance (for example, 5 km, 10 km, 15 km, etc.). The air conditioning energy consumption Eac is an amount of electric power that is also obtained, for example, by multiplying the air conditioning energy consumption at that time by the time required to drive the predetermined distance (for example, 5 km, 10 km, 15 km, etc.). Further, when the air conditioning power consumption at that time is equal to or larger than a first power consumption, the air conditioning energy consumption Eac can be obtained by multiplying the first power consumption by the time required to drive the predetermined distance (for example, 5 km, 10 km, 15 km, etc.). When the air conditioning power consumption at that time is smaller than the first power consumption, the air conditioning energy consumption Eac can be obtained by multiplying a second power consumption that is smaller than the first power consumption by the time required to drive the predetermined distance (for example, 5 km, 10 km, 15 km, etc.). Here, as the first power consumption, relatively large power (for example, power of ¾ or ⅘ of the maximum power consumption) can be used as the power consumption of the air conditioning system. As the second power consumption, relatively small power (for example, power of ¼ or ⅕ of the maximum power consumption) can be used as the power consumption of the air conditioning system.

The HVECU 50 calculates a correction battery remaining capacity Ebat that is equivalent to the battery remaining capacity taking into account the power consumption of the air conditioning system by subtracting the air conditioning energy consumption Eac from the battery remaining capacity (step S135). The remaining capacity of the battery 40 can be calculated by multiplying the total capacity of the battery 40 by the state of charge SOC. The HVECU 50 determines whether the total energy Esum is larger than the correction battery remaining capacity Ebat (step S140). When it is determined that the total energy Esum is equal to or smaller than the correction battery remaining capacity Ebat, the HVECU 50 assigns the CD mode to all the drive sections (step S150). When it is determined that the total energy Esum is larger than the correction battery remaining capacity Ebat, the HVECU 50 rearranges each drive sections in descending order of the driving load (energy consumption En) (step S160). The HVECU 50 subsequently assigns the CD mode to the rearranged drive sections in descending order of the driving load until the total energy consumption En of the each assigned drive sections exceeds the remaining capacity of the battery 40, and assigns the CS mode to the remaining drive sections (step S170). Accordingly, the CD mode and the CS mode are assigned to the drive route on condition that the total energy Esum is larger than the correction battery remaining capacity Ebat. Then, the HVECU 50 controls the drive mode along the drive support plan of the assigned drive mode (step S190).

When it is determined at step S110 that the read-ahead information is not updated, the HVECU 50 determines whether the drive support control is being performed (step S180). When it is determined at step S180 that the drive support control is not being performed, the HVECU 50 returns the processing flow to step S100, where it is determined whether the drive support control can be performed. When it is determined at step S180 that the drive support control is being performed, the HVECU 50 controls the drive mode along the drive support plan that is created immediately before (step S190).

The HVECU 50 determines whether terminating condition of the drive support control is satisfied (step S200). The terminating condition of the drive support control includes, for example, a condition when the destination is changed, a condition when the hybrid vehicle reaches the destination, a condition when the remaining capacity of the battery 40 is changed due to charging or the like, and a condition when an operation for terminating the drive support control is performed by the driver or the like. When it is determined at step S200 that the terminating condition of the drive support control is not satisfied, the HVECU 50 returns the processing flow to step S100, where it is determined whether the drive support control can be performed. When it is determined at step S200 that the terminating condition of the drive support control is satisfied, the HVECU 50 terminates the drive support control (step S210) and terminates this routine. The HVECU 50 terminates the drive support control when the destination is changed or the remaining capacity of the battery 40 is changed due to charging or the like. The HVECU 50, however, performs the drive support control of FIG. 2 again when a drive support control should be started again.

When it is determined at step S105 that the predetermined condition is satisfied, the driving state is continued (step S195), and proceeds to step S200, where it is determined whether the terminating condition of the drive support control is satisfied. The driving state here means the state of the motor drive or the state of the hybrid drive. The predetermined condition is satisfied when all of conditions that regenerative electric power amount to the destination is equal to or larger than the predetermined electric power amount, the distance to the destination is equal to or greater than the predetermined distance, the battery remaining capacity without taking into account the power consumption of the air conditioning system (actual battery remaining capacity) is equal to or smaller than the predetermined remaining capacity, the drive mode in the drive section where the hybrid vehicle is currently driving is the CD mode, and the hybrid drive is temporarily selected are satisfied. The drive mode is likely to change to the motor drive when the condition described above is satisfied. However, since the hybrid drive is temporarily selected, the drive mode is changed to the hybrid drive in a short time even the drive mode is shifted to the motor drive, and hunting (inversion) is likely to occur. By continuing the driving state (hybrid drive), it is possible to suppress hunting (inversion)

such that the driving state is changed from the hybrid drive to the motor drive and further changed from the motor drive to the hybrid drive.

Further, the predetermined condition is satisfied when all of conditions that the battery remaining capacity without taking into account the power consumption of the air conditioning system (actual battery remaining capacity) is equal to or smaller than the predetermined remaining capacity, the distance to the destination is equal to or less than the predetermined distance, and the motor drive is selected are satisfied. The driving state is likely to change from the motor drive to the hybrid drive when the condition described above is satisfied. However, since the distance to the destination is short, the driving state is changed to the motor drive to reduce the battery remaining capacity, and hunting (inversion) is likely to occur. By continuing the driving state (motor drive), it is possible to suppress hunting (inversion) such that the driving state is changed from the motor drive to the hybrid drive and further changed from the hybrid drive to the motor drive.

Further, the predetermined condition is satisfied when all of conditions that the hybrid vehicle is driving on a highway, the battery remaining capacity without taking into account the power consumption of the air conditioning system (actual battery remaining capacity) is equal to or larger than the predetermined remaining capacity, the mode that automatically shift to the motor drive is selected, and the hybrid drive is selected. The driving state is likely to change to the motor drive when the condition described above is satisfied. However, since the hybrid vehicle is driving on a highway, the driving state is changed to the hybrid drive in a short time even the driving state is shifted to the motor drive, and hunting (inversion) is likely to occur. By continuing the driving state (hybrid drive), it is possible to suppress hunting (inversion) such that the driving state is changed from the hybrid drive to the motor drive and further changed from the motor drive to the hybrid drive.

The following describes the read-ahead information generation and transmission process of FIG. 3. The navigation system 80 first determines whether the route guidance is being performed (step S300). Whether the route guidance is being performed is determined based on whether the drive route is set, and the route guidance is being performed in accordance with the input of the destination. When it is determined at step S300 that the route guidance is not being performed, the navigation system 80 waits until the route guidance is performed.

When it is determined at step S300 that the route guidance is being performed, the navigation system 80 generates the read-ahead information to the destination (final destination) and increments a counter C for the read-ahead information by a value 1 (step S310). The read-ahead information includes information on each of drive sections of the drive route, information on driving load in the road traffic information obtained from the traffic information management center 100, and load information necessary for driving each drive section based on a vehicle speed of the own vehicle, a driving power of the own vehicle, and a drive mode of the own vehicle. The counter C is set to a value 0 as an initial value.

The navigation system 80 transmits the generated read-ahead information and the counter C to the HVECU 50 (step S320). The navigation system. 80 waits for a predetermined time period to elapse (step S330) and determines whether the terminating condition of the drive support control is satisfied (step S340). When it is determined at step S340 that the terminating condition of the drive support control is not satisfied, the navigation system 80 returns the processing flow to step S310, where the navigation system 80 generates the read-ahead information and increments the counter C. Accordingly, the navigation system 80 repeatedly performs the processing of generating the read-ahead information, incrementing the counter C, and transmitting the read-ahead information and the counter C to the HVECU 50 every time the predetermined time elapses until the drive support control is terminated.

When it is determined at step S340 that the terminating condition of the drive support control is satisfied, the navigation system 80 deletes (erases) the read-ahead information or the like (step S350) and terminates this routine.

In the drive support control and the read-ahead information generation and transmission process described above, the read-ahead information is generated every time the predetermined time period elapses, and the drive support plan is created and performed based on the generated read-ahead information. Since the drive support plan is created based on the battery remaining capacity taking into account the air conditioning energy consumption Eac, more appropriate drive support plan can be created. When it is determined that the predetermined condition is satisfied, the HVECU 50 continues the driving state. For example, as the predetermined condition, when all of conditions that regenerative electric power amount to the destination is equal to or larger than the predetermined electric power amount, the distance to the destination is equal to or greater than the predetermined distance, the battery remaining capacity without taking into account the power consumption of the air conditioning system (actual battery remaining capacity) is equal to or smaller than the predetermined remaining capacity, the drive mode in the drive section where the hybrid vehicle is currently driving is the CD mode, and the hybrid drive is temporarily selected are satisfied, the hybrid drive is continued. This suppresses hunting of the driving state and suppresses the driving state indicator 67 blinking in a short time. Further, for example, as the predetermined condition, when all of conditions that the battery remaining capacity without taking into account the power consumption of the air conditioning system (actual battery remaining capacity) is equal to or smaller than the predetermined remaining capacity, the distance to the destination is equal to or less than the predetermined distance, and the motor drive is selected are satisfied, the motor drive is continued. This suppresses hunting of the driving state and suppresses the driving state indicator 67 blinking in a short time. Furthermore, for example, as the predetermined condition, when all of conditions that the hybrid vehicle is driving on a highway, the battery remaining capacity without taking into account the power consumption of the air conditioning system (actual battery remaining capacity) is equal to or larger than the predetermined remaining capacity, the mode that automatically shift to the motor drive is selected, and the hybrid drive is selected are satisfied, the hybrid drive is continued. This suppresses hunting of the driving state and suppresses the driving state indicator 67 blinking in a short time. As a result, these suppress hunting (inversion) of the driving state in a short time and suppress the driving state indicator 67 blinking in a short time.

In the hybrid vehicle 20 of the embodiment, the navigation system. 80 generates the read-ahead information, and the HVECU 50 creates the drive support plan and performs the drive support control. The navigation system 80 and the HVECU 50 may, however, be configured as a single electronic controller and this single electronic controller may generate read-ahead information and drive support plan and perform drive support control.

In the hybrid vehicle 20 of the embodiment, the navigation system 80 sets the drive route from the current location to the destination using the map information data base 84 based on information on the current location and the destination. A modification may, however, set the drive route from the current location to the destination in cooperation with the traffic information management center 100. The navigation system 80 may set the drive route by transmitting the information on the current location and the destination to the traffic information management center 100 and receiving the drive route set based on the information on the current location and the destination from the traffic information management center 100.

In the hybrid vehicle 20 of the embodiment, the navigation system 80 generates, for example, load information necessary for driving each drive section based on road traffic information obtained from the traffic information management center 100 every time road traffic information is obtained (or at every predetermined time interval) from the traffic information center 100. A modification may, however, store road traffic information in advance and generate the read-ahead information based on the road traffic information stored at every predetermined time interval.

In the hybrid vehicle 20 of the embodiment, the navigation system 80 counts up the alive counter Cnb and the HVECU 50 confirms that the alive counter Cnb is counted up by the navigation system 80. This is, however, not restrictive, but such confirmation may not be performed.

In the hybrid vehicle of the present disclosure, the predetermined condition may be satisfied when all of conditions that regenerative electric power amount to the destination is equal to or larger than a predetermined electric power amount, a distance to the destination is equal to or greater than a predetermined distance, the battery remaining capacity without taking into account the power consumption of the air conditioning system is equal to or smaller than a predetermined remaining capacity, the drive mode in the drive section where the hybrid vehicle is currently driving is the CD mode, and a hybrid drive is temporarily selected are satisfied. The drive mode is likely to change to the motor drive when the predetermined condition described above is satisfied. However, since the hybrid drive is temporarily selected, the drive mode is changed to the hybrid drive in a short time even the drive mode is shifted to the motor drive, and hunting (inversion) is likely to occur. By continuing the drive mode (hybrid drive), it is possible to suppress hunting (inversion) such that the drive mode is changed from the hybrid drive to the motor drive and further changed from the motor drive to the hybrid drive.

In the hybrid vehicle of the present disclosure, the predetermined condition may be satisfied when all of conditions that the battery remaining capacity without taking into account the power consumption of the air conditioning system is equal to or smaller than a predetermined remaining capacity, the distance to the destination is equal to or less than a predetermined distance, and a motor drive is selected are satisfied. The drive mode is likely to change from the motor drive to the hybrid drive when the predetermined condition described above is satisfied. However, since the distance to the destination is short, the drive mode is changed to the motor drive to reduce the battery remaining capacity, and hunting (inversion) is likely to occur. By continuing the driving state (motor drive), it is possible to suppress hunting (inversion) such that the drive mode is changed from the motor drive to the hybrid drive and further changed from the hybrid drive to the motor drive.

In the hybrid vehicle of the present disclosure, the predetermined condition is satisfied when all of conditions that the hybrid vehicle is driving on a highway, the battery remaining capacity without taking into account the power consumption of the air conditioning system is equal to or larger than a predetermined remaining capacity, a mode that automatically shift to a motor drive is selected, and a hybrid drive is selected are satisfied. The drive mode is likely to change to the motor drive when the predetermined condition described above is satisfied. However, since the hybrid vehicle is driving on a highway, the drive mode is changed to the hybrid drive in a short time even the drive mode is shifted to the motor drive, and hunting (inversion) is likely to occur. By continuing the drive mode (hybrid drive), it is possible to suppress hunting (inversion) such that the drive mode is changed from the hybrid drive to the motor drive and further changed from the motor drive to the hybrid drive.

The following describes the correspondence relationship between the primary elements of the above embodiment and the primary elements of the disclosure described in Summary. In the embodiment, the engine EG corresponds to the "engine", the motor MG corresponds to the "motor", the battery 40 corresponds to the "battery", the air conditioning system corresponds to the "air conditioning system", and the HVECU 50 and the navigation system 80 correspond to the "control device". Further, the navigation system 80 corresponds to the "navigation system".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the hybrid vehicle and so on.

The invention claimed is:

1. A hybrid vehicle, comprising:
an engine;
a motor;
a battery;
an air conditioning system configured to condition air in a passenger compartment;
a map information database configured to store map information;
a GPS configured to detect location information; and
an electronic controller configured to set a drive route from a current location to a destination, to create a drive support plan that assigns one of drive modes including a CD mode and a CS mode to each of drive sections of the drive route, and to perform drive support control that causes the hybrid vehicle to be driven along the drive support plan, wherein the electronic controller comprises a device configured to create the drive support plan based on battery remaining capacity taking into account a power consumption of the air conditioning system, and to continue a driving state when a predetermined condition that is based on the battery remaining capacity without taking into account the power consumption of the air conditioning system is satisfied during the drive support control.

2. The hybrid vehicle according to claim 1, wherein the predetermined condition is satisfied when all of conditions that regenerative electric power amount to the destination is equal to or larger than a predetermined electric power amount, a distance to the destination is equal to or greater than a predetermined distance, the battery remaining capacity without taking into account the power consumption of the air conditioning system is equal to or smaller than a predetermined remaining capacity, a drive mode in the drive section where the hybrid vehicle is currently driving is the CD mode, and a hybrid drive is temporarily selected are satisfied.

3. The hybrid vehicle according to claim 1, wherein the predetermined condition is satisfied when all of conditions that the battery remaining capacity without taking into account the power consumption of the air conditioning system is equal to or smaller than a predetermined remaining capacity, a distance to the destination is equal to or less than a predetermined distance, and a motor drive is selected are satisfied.

4. The hybrid vehicle according to claim 1, wherein the predetermined condition is satisfied when all of conditions that the hybrid vehicle is driving on a highway, the battery remaining capacity without taking into account the power consumption of the air conditioning system is equal to or larger than a predetermined remaining capacity, a mode that automatically shift to a motor drive is selected, and a hybrid drive is selected are satisfied.

* * * * *